(12) United States Patent
Kim et al.

(10) Patent No.: US 11,668,605 B1
(45) Date of Patent: Jun. 6, 2023

(54) SYSTEM AND METHOD FOR DETECTING FLAME BASED UPON FLUTTERING INFORMATION AND CENTROID SPATIAL DISTRIBUTION INFORMATION OF A FLAME

(71) Applicant: ELECTRONICS AND TELECOMMUNICATIONS RESEARCH INSTITUTE, Daejeon (KR)

(72) Inventors: Soo Cheol Kim, Daejeon (KR); Hyun Seok Kim, Daejeon (KR); So Yung Park, Daejeon (KR); Hoe Sung Yang, Daejeon (KR); Kang Bok Lee, Daejeon (KR); Kwang Soo Cho, Daejeon (KR); Kyu Won Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/860,227

(22) Filed: Jul. 8, 2022

(30) Foreign Application Priority Data

Nov. 24, 2021 (KR) .................. 10-2021-0163683

(51) Int. Cl.
*G01J 5/00* (2022.01)
*G01J 1/44* (2006.01)
(52) U.S. Cl.
CPC .............. *G01J 5/0018* (2013.01); *G01J 1/44* (2013.01)
(58) Field of Classification Search
CPC ................................ G01J 5/0018; G01J 1/44

USPC ............................ 250/205, 554, 555, 214 R
See application file for complete search history.

(56) References Cited

U.S. PATENT DOCUMENTS

| 4,749,862 A * | 6/1988 | Yoshida ................ G08B 17/12 250/342 |
|---|---|---|
| 9,092,959 B2 | 7/2015 | Kim et al. |
| 2021/0142101 A1 | 5/2021 | Jang et al. |

FOREIGN PATENT DOCUMENTS

| KR | 10-1604571 B1 | 3/2016 |
|---|---|---|
| KR | 10-1767980 B1 | 8/2017 |
| KR | 10-1953878 B1 | 5/2019 |
| KR | 10-1975861 B1 | 5/2019 |
| KR | 10-2001595 B1 | 10/2019 |

* cited by examiner

*Primary Examiner* — Que Tan Le
*Assistant Examiner* — Mai Thi Ngoc Tran
(74) *Attorney, Agent, or Firm* — LRK Patent Law Firm (57) ABSTRACT

Provided is a system for detecting flame, which includes a light collecting module configured to collect light emitted from flame and sense location information and intensity information of the collected light, a memory configured to store a program for determining fire information on the basis of the sensed location information and intensity information of the light, and a processor configured to calculate intensity information and fluttering information of the flame from the intensity information of the light by executing the program stored in the memory, to calculate centroid spatial distribution information of the flame from the location information of the light, and to detect whether there is flame on the basis of at least one of the intensity information of the flame, the fluttering information of the flame, and the centroid spatial distribution information.

17 Claims, 7 Drawing Sheets

SYSTEM AND METHOD FOR DETECTING FLAME BASED UPON FLUTTERING INFORMATION AND CENTROID SPATIAL DISTRIBUTION INFORMATION OF A FLAME

CROSS-REFERENCE TO RELATED APPLICATION

This application claims priority to and the benefit of Korean Patent Application No. 10-2021-0163683, filed on Nov. 24, 2021, the disclosure of which is incorporated herein by reference in its entirety.

BACKGROUND

1. Technical Field

The present disclosure relates to a system and a method for detecting flame.

2. Related Art

A general fire detector determines fire by detecting combustion products such as heat, smoke, flame, combustion gas, and burning sound generated from fire. Particularly, a flame detector is widely used in places where the installation of heat and smoke detectors is limited because the flame detector can quickly detect fire from a long distance.

As a flame detection technology in the related art, Korean Patent No. 10-1604571 (title of invention: Three Wavelength Type Infrared Flame Detector Having Ultraviolet Sensor) discloses a technology for detecting flame using ultraviolet and infrared rays.

However, since the related art uses a multi-wavelength sensor in order to reduce optical signal interference caused by various factors (arc welding, electric heater, sunlight, halogen lamp, and the like), the flame detector is very expensive. Furthermore, there was a difficulty in analyzing a flickering signal of flame depending on the surrounding environment such as water vapor, smoke, and fine dust, which causes malfunction of flame detection.

SUMMARY

Various embodiments are directed to providing a system and a method for detecting flame, which detect whether there is flame by calculating intensity information, flickering information, and centroid spatial distribution information of flame on the basis of intensity and location information of light generated from the flame.

However, the problems to be solved by the present disclosure are not limited to the above-described problems, and other problems may be present.

In order to solve the above-described problems, a system for detecting flame in accordance with a first aspect of the present disclosure may include: a light collecting module configured to collect light emitted from flame and sense location information and intensity information of the collected light; a memory configured to store a program for determining fire information on the basis of the sensed location information and intensity information of the light; and a processor configured to calculate intensity information and fluttering information of the flame from the intensity information of the light by executing the program stored in the memory, to calculate centroid spatial distribution information of the flame from the location information of the light, and to detect whether there is flame on the basis of at least one of the intensity information of the flame, the fluttering information of the flame, and the centroid spatial distribution information.

Furthermore, a method performed by a system for detecting flame in accordance with a second aspect of the present disclosure may include: a step of collecting light emitted from flame; a step of sensing location information and intensity information of the collected light; a step of calculating intensity information and flickering information of the flame from the intensity information of the light; a step of calculating centroid spatial distribution information of the flame from the location information of the light; and a step of detecting whether there is flame on the basis of at least one of the intensity information of the flame, the flickering information, and the centroid spatial distribution information.

In order to solve the above-described problems, a computer program in accordance with another aspect of the present disclosure is coupled to a computer as hardware, executes the method for detecting flame, and is stored in a computer readable recording medium.

The other details of the present disclosure are included in the detailed descriptions and the drawings.

In accordance with an embodiment of the present disclosure described above, flame detection accuracy is higher than that of a flame detector in the related art, and the cost of a sensor is also low, so that the economic effect is very large. This can be expected to form a new market for the fire and firefighting industry.

Furthermore, it is possible to detect flame with high accuracy without unwanted optical signals and interference from the surrounding environment that causes flickering, and further to ascertain and provide the scale of fire and the direction of flame.

Furthermore, unlike existing fire (heat, smoke, and the like) detectors having a limitation in installation due to the surrounding environment and building structure, there is no restriction in installation and fire damage can be minimized by enabling rapid fire detection.

The effects of the present disclosure are not limited to the above-mentioned effects, and the other effects which are not mentioned herein will be clearly understood from the following descriptions by those skilled in the art.

DETAILED DESCRIPTION

The advantages and characteristics of the present disclosure and a method for achieving the advantages and characteristics will be clearly understood through embodiments to be described in detail together with the accompanying drawings. However, the present disclosure is not limited to the following embodiments, but may be implemented in various shapes different from each other, and the present embodiments are provided to bring the disclosure of the present disclosure to perfection and assist those skilled in the art to completely understand the scope of the present disclosure. Therefore, the present disclosure is defined only by the scope of the appended claims.

Terms used in the present specification are used for describing embodiments, not limiting the present disclosure. The terms of a singular form in the present specification may include plural forms unless specifically mentioned. The meaning of 'comprise' and 'comprising' used in the specification does not exclude the presence or addition of one or more other components in addition to the mentioned components. Throughout the specification, like reference numerals represent the same components, and the term "and/or" includes each of mentioned components and one or more combinations thereof. Although terms "first" and "second" are used to describe various components, the components are not limited by the terms. The terms are used only to distinguish one element from another element. Therefore, a first component described below may be a second component within the technical idea of the present disclosure.

Unless defined differently, all terms (including technical and scientific terms) used in this specification may be used as meanings which may be commonly understood by those skilled in the art to which the present disclosure pertains. Furthermore, terms which are defined in generally used dictionaries are not ideally or excessively construed unless clearly and specifically defined.

Figure 1:
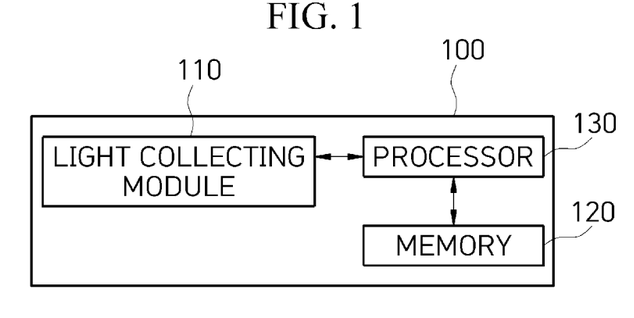
FIG. 1 is a block diagram of a system for detecting flame in accordance with an embodiment of the present disclosure.
Figure 2:
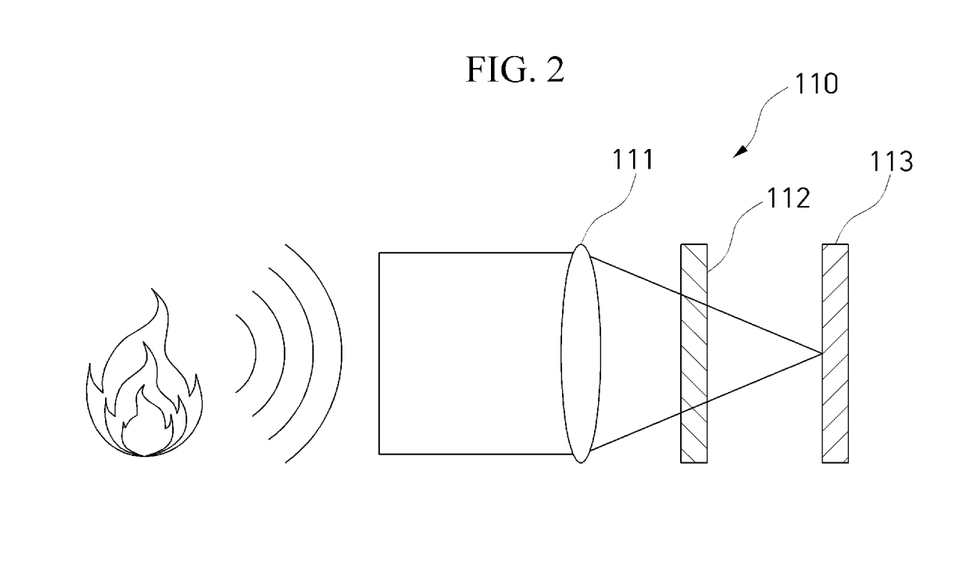
FIG. 2 is a diagram for explaining a light collecting module in an embodiment of the present disclosure.

FIG. 1 is a block diagram of a system 100 for detecting flame in accordance with an embodiment of the present disclosure, and FIG. 2 is a diagram for explaining a light collecting module in an embodiment of the present disclosure.

The system 100 for detecting flame in accordance with an embodiment of the present disclosure includes a light collecting module 110, a memory 120, and a processor 130.

The light collecting module 110 includes a lens 111, a predetermined optical filter 112, and a position sensitive detector for sensing location information of collected light, collects light emitted from flame, and senses the location information and the intensity information of the collected light.

That is, the light emitted from the flame passes through the lens 111 and the optical filter 112 and is collected on the position sensitive detector. In such a case, the position sensitive detector measures the location information of the light in a first direction and a second direction, and for example, the first direction and the second direction may be an x direction and a y direction, but are not limited thereto.

The memory 120 stores a program for determining fire information on the basis of the sensed location information and intensity information of the light, and the processor 130 executes the program stored in the memory 120. The memory 120 collectively refers to a nonvolatile storage device and a volatile storage device that continuously maintain stored information even though power is not supplied.

For example, the memory 120 may include a NAND flash memory such as a compact flash (CF) card, a secure digital (SD) card, a memory stick, a solid-state drive (SSD), and a micro SD, a magnetic computer storage device such as a hard disk drive (HDD), an optical disc drive such as a CD-ROM and a DVD-ROM.

The processor 130 analyzes intensity information and flickering information of the flame from the intensity information of the light by executing the program stored in the memory 120. Then, the processor 130 analyzes centroid spatial distribution information of the flame from the location information of the light. Based on the above information, the processor 130 may ascertain the presence or absence of flame, the presence or absence of fire, the scale of the fire, the presence or absence and characteristics of the fire including flame direction information.

Figure 3:
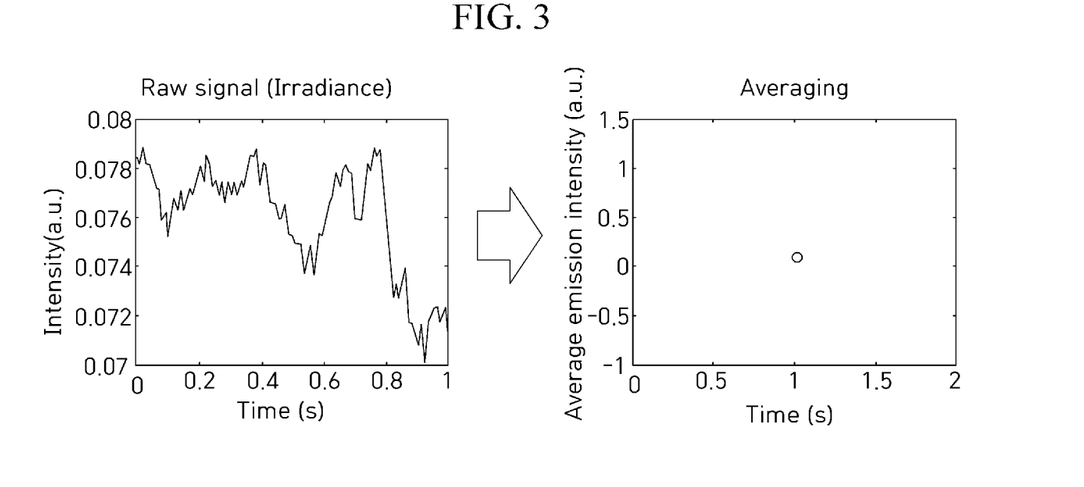
FIG. 3 is a diagram for explaining the content of analyzing flame intensity information on the basis of light intensity information in an embodiment of the present disclosure.

FIG. 3 is a diagram for explaining the content of analyzing flame intensity information based on light intensity information in an embodiment of the present disclosure.

In an embodiment, the processor 130 may obtain signal values for the intensity information of light measured through the light collection module 110 for a preset time, and calculate the intensity information of flame by averaging the acquired signal values on the basis of the preset time.

Then, the processor 130 may compare the calculated intensity information of the flame with a preset intensity to detect the flame as flame, and determine the scale of fire.

Figure 4:
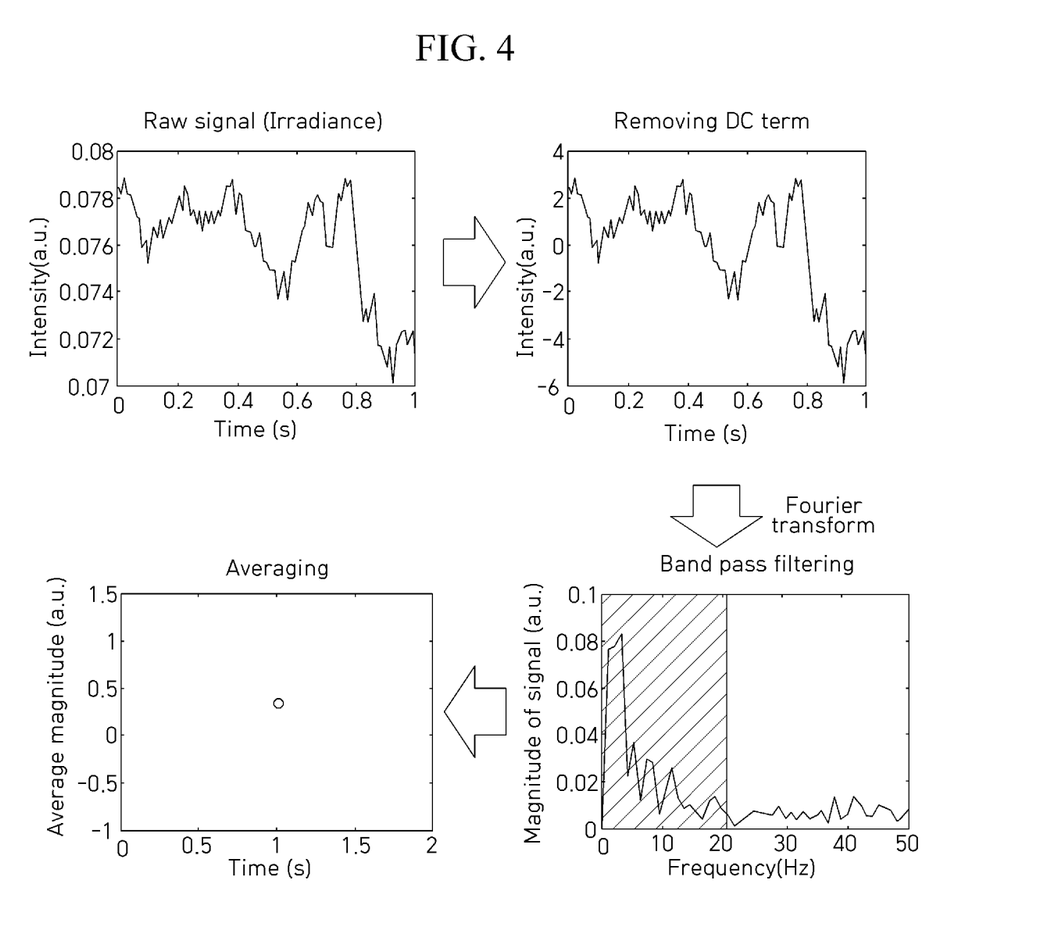
FIG. 4 is a diagram for explaining the content of analyzing flame flickering information on the basis of light intensity information in an embodiment of the present disclosure.

FIG. 4 is a diagram for explaining the content of analyzing flame flickering information based on light intensity information in an embodiment of the present disclosure.

In an embodiment, the processor 130 calculates an average value obtained by averaging the signal values for the intensity information of the light measured for the preset time, and subtracts the calculated average value from the signal values for the intensity information of the light measured for the preset time, and removes a direct current (DC) signal. Next, the processor 130 may convert a time domain signal for the result value obtained by removing the DC signal into a frequency domain by using a Fourier transform, and then averages frequency signal values in a preset frequency domain to calculate the flickering information.

Furthermore, when the calculated flickering information is equal to or more than a preset flickering value, the processor 130 may detect flame and then determine whether there is fire. Furthermore, the processor 130 may compare preset minimum flickering information and maximum flickering information with the calculated flickering information, determine the scale of fire by matching the comparison result with a predetermined grade. The minimum flickering information and the maximum flickering information may be set as default values at the time of initial setting, and a central management server (not illustrated) may collect flickering information generated when the fire detection system 100 provided at each location determines whether there is fire, and update the minimum and maximum flickering information through the collected flickering information. As described above, an embodiment of the present disclosure may be applied to each fire detection system 100 as the minimum and maximum flickering information is updated, thereby more accurately providing the scale of fire.

Figure 5:
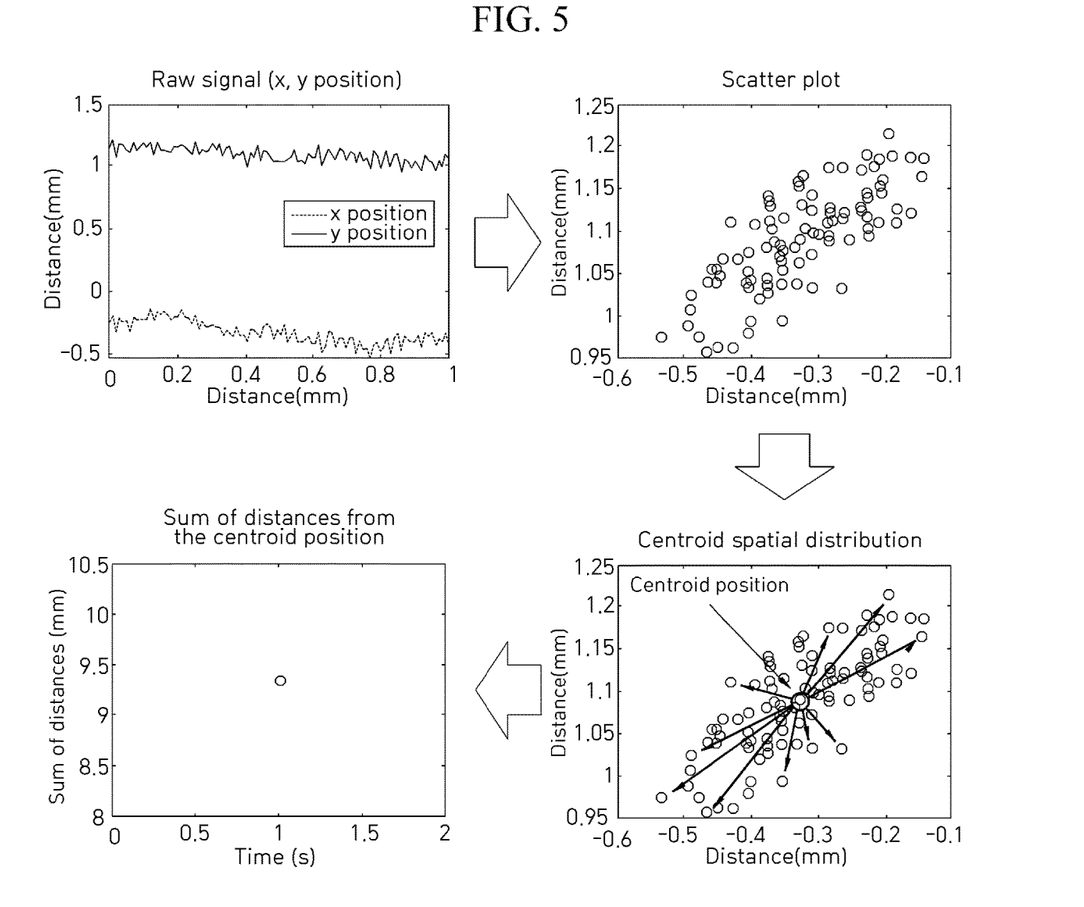
FIG. 5 is a diagram for explaining the content of analyzing centroid spatial distribution information in an embodiment of the present disclosure.

FIG. 5 is a diagram for explaining the content of analyzing centroid spatial distribution information in an embodiment of the present disclosure.

In an embodiment, the processor 130 calculates centroid positions by averaging location information in the first and second directions of the light measured for the preset time in the first direction and the second direction, respectively. Then, the processor 130 may calculate distances between the calculated centroid position and the location information measured for the preset time, and sum or average the distances to calculate centroid spatial distribution information indicating distances from the centroid positions over time.

Based on the above, the processor 130 may detect flame when the centroid spatial distribution information, that is, the calculated distance to the centroid is greater than a preset distance to the centroid, and determines whether there is fire when determining flame detection.

Furthermore, the processor 130 may determine the scale of the fire on the basis of the degree of increase or decrease in the centroid spatial distribution information. That is, the processor 130 may determine that the scale of the fire increases when the centroid spatial distribution information gradually increases over time, and determine that the scale of the fire decreases when the centroid spatial distribution information gradually decreases over time, thereby determining the scale of the fire. The time may be set in a predetermined time range.

Furthermore, the processor 130 may acquire direction information of the flame by tracking the location of the averaged centroid position. That is, information on the progress direction of the flame may be acquired by tracking the direction in which the location of the averaged centroid position moves over time.

In addition, the processor 130 may calculate the centroid spatial distribution information through various methods, for example, area calculation through convex hull measurement, and analyze the flame direction by calculating a vector component of the centroid over time.

Figure 6A:
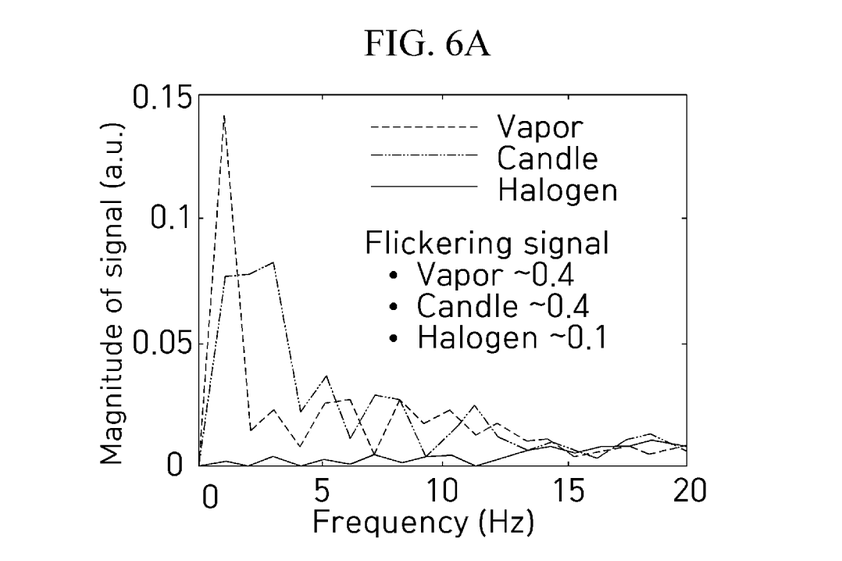
FIG. 6A to FIG. 6D are diagrams illustrating results of testing the flickering information and the centroid spatial distribution information in accordance with an embodiment of the present disclosure.
Figure 6B:
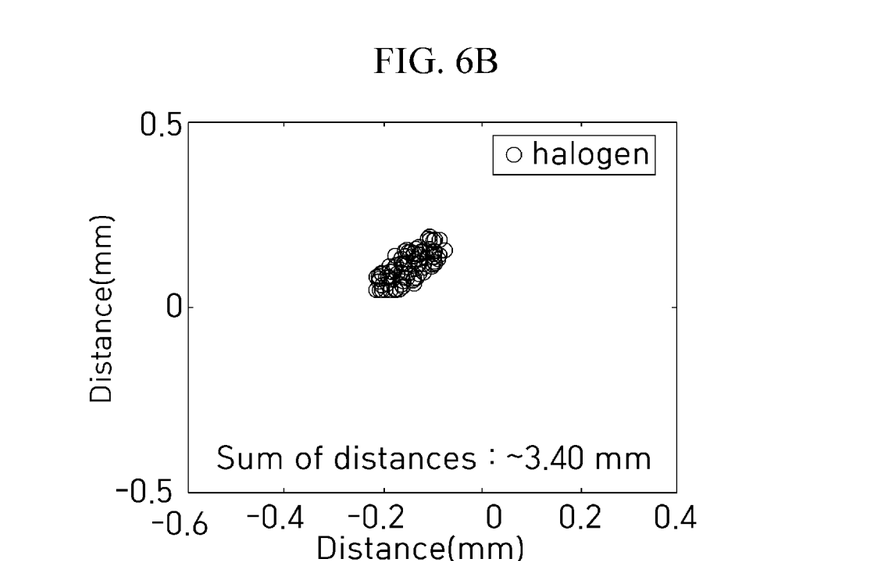

FIG. 6A to FIG. 6B are diagrams illustrating results of testing flickering information and centroid spatial distribution information in accordance with an embodiment of the present disclosure.

FIG. 6A illustrates flickering signals in a frequency domain immediately before flickering information detected from a halogen lamp in a water vapor environment, a general halogen lamp, and a candle is calculated. It can be seen that a flickering signal in the halogen lamp in the vapor environment and a flickering signal in the candle environment appear very similar, and through this, it can be seen that the presence or absence of flame may not be accurately determined only by the flickering signals.

Figure 6C:
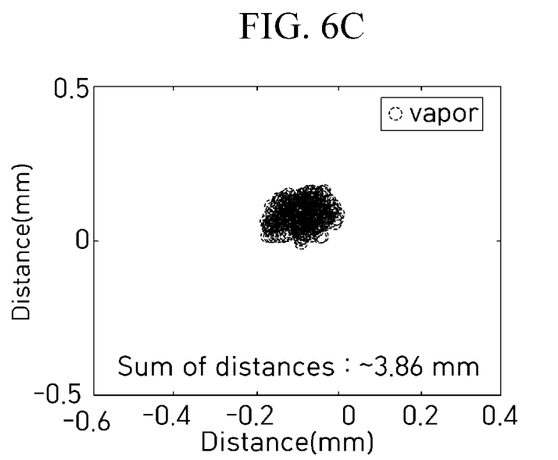
Figure 6D:
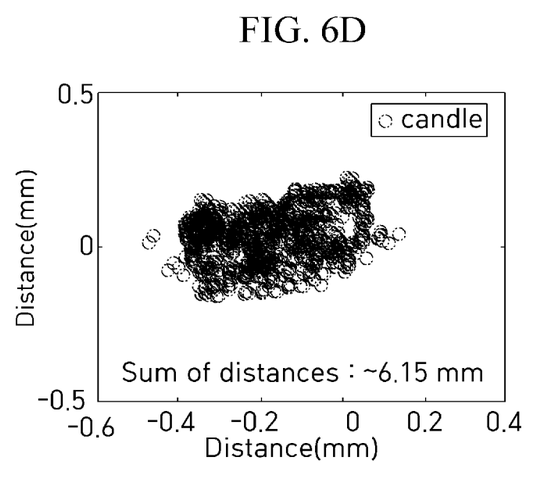

On the other hand, FIG. 6B to FIG. 6D illustrate analysis of centroid spatial distribution information detected from the halogen lamp in a water vapor environment, the general halogen lamp, and the candle, and it can be seen that there is a clear difference between the distance to a centroid measured by the halogen lamp in a vapor environment and the distance to the centroid measured from the candle. As described above, in an embodiment of the present disclosure, the presence or absence of flame may be accurately detected using centroid spatial distribution information.

Figure 7:
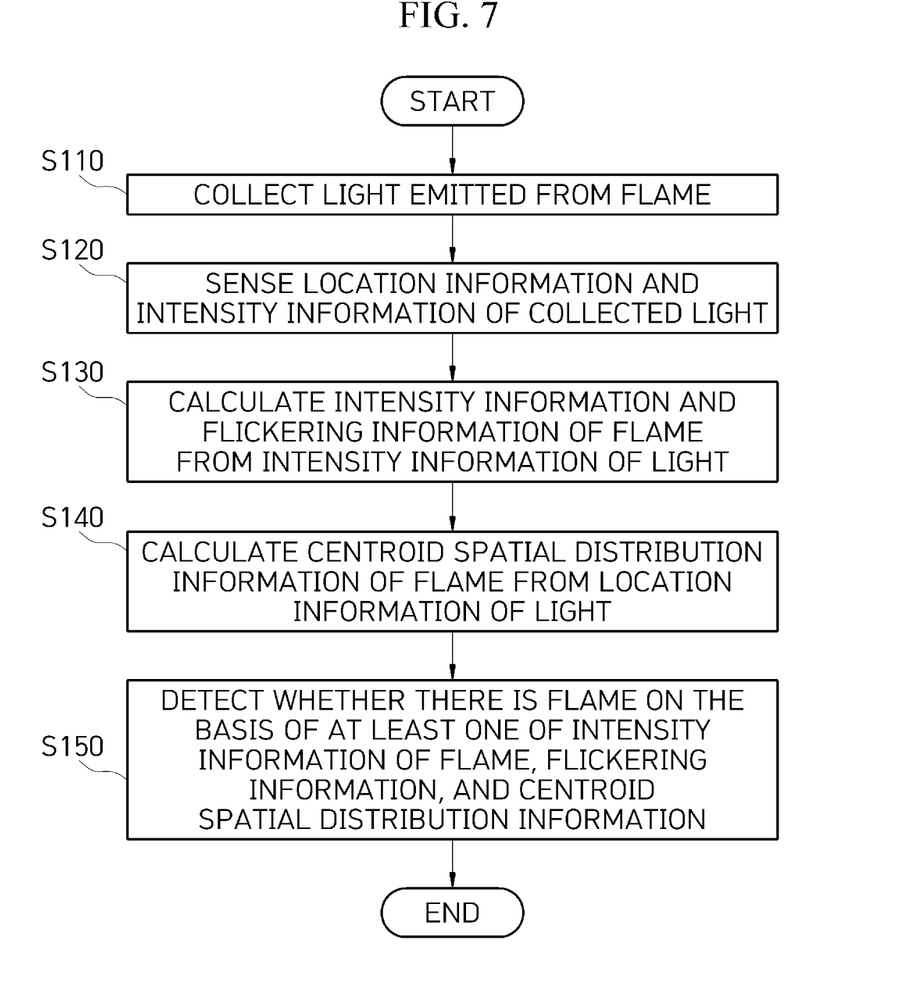
FIG. 7 is a flowchart of a method for detecting flame in accordance with an embodiment of the present disclosure.

FIG. 7 is a flowchart of a method for detecting flame in accordance with an embodiment of the present disclosure.

Steps illustrated in FIG. 7 may be understood to be performed by the system 100 for detecting flame described above, but are not necessarily limited thereto.

First, light emitted from flame is collected through the light condensing module 110 including the lens 111, the optical filter 112 and the position sensitive detector (S110), and the location information and intensity information of the collected light are sensed (S120).

Next, the intensity information and flickering information of the flame are calculated from the intensity information of the light (S130), and the centroid spatial distribution information of the flame is calculated from the location information of the light (S140).

Next, whether there is flame is detected on the basis of at least one of the intensity information of the flame, the flickering information, and the centroid spatial distribution information (S150).

In the above description, steps S110, S120, S130, S140, and S150 may be further divided into additional steps or combined into fewer steps according to an embodiment of the present invention. Furthermore, some steps may be omitted as needed, or the order of the steps may be changed. The contents of FIG. 1 and the contents of FIG. 6A may be applied to the method for detecting flame of FIG. 7.

The method for detecting flame in accordance with the above-described embodiment of the present disclosure may be implemented as a program (or application) and stored in a medium, so as to be executed through a computer as hardware which is coupled thereto.

The above-described program may include codes written by a computer language such as C, C++, JAVA, Ruby or machine language, which can be read by a processor (CPU) of the computer through a device interface of the computer, in order to execute the above-described methods which are implemented as a program read by the computer. Such codes may include a functional code related to a function defining functions required for executing the above-described methods, and include an execution procedure-related control code required for the processor of the computer to execute the functions according to a predetermined procedure. Furthermore, such codes may further include additional information required for the processor of the computer to execute the functions or a memory reference-related code indicating the position (address) of an internal or external memory of the computer, where a medium needs to be referred to. Furthermore, when the processor of the computer needs to communicate with another remote computer or server in order to execute the functions, the codes may further include communication-related codes indicating how to communicate with another remote computer or server by using a communication module of the computer and which information or media to transmit or receive during communication.

The stored medium does not indicate a medium such as a register, cache or memory, which stores data for a short moment, but indicates a medium which semi-permanently stores data and can be read by a device. Specifically, examples of the storage medium include a ROM, RAM, CD-ROM, magnetic tape, floppy disk, optical data storage device and the like, but are not limited thereto. That is, the program may be stored in various recording media on various servers which the computer can access or various recording media of a user's computer. Furthermore, the media may store codes which can be distributed in computer systems connected through a network, and read by computers in a distributed manner.

The descriptions of the present disclosure are only examples, and those skilled in the art to which the present disclosure pertains will understand that the present disclosure can be easily modified into other specific forms without changing the technical spirit or essential features of the present disclosure. Therefore, it should be understood that the above-described embodiments are only illustrative in all aspects and are not limitative. For example, components described in a singular form may be distributed and embodied. Similarly, distributed components may be embodied in a coupled form.

The scope of the present disclosure is defined by the claims to be described below rather than the detailed description, and it should be construed that the meaning and scope of the claims and all changes or modified forms derived from the equivalent concept thereof are included in the scope of the present disclosure.

What is claimed is:

1. A system for detecting flame, the system comprising:
a light collecting module configured to collect light emitted from flame and sense location information and intensity information of the collected light;
a memory configured to store a program for determining fire information on the basis of the sensed location information and intensity information of the light; and
a processor configured to calculate intensity information and fluttering information of the flame from the intensity information of the light by executing the program stored in the memory, to calculate centroid spatial distribution information of the flame from the location information of the light, and to detect whether there is flame on the basis of at least one of the intensity information of the flame, the fluttering information of the flame, and the centroid spatial distribution information.

2. The system of claim 1, wherein the light collecting module includes a lens, a predetermined optical filter, and a position sensitive detector for sensing the location information of the collected light.

3. The system of claim 1, wherein the processor calculates the intensity information of the flame by averaging signal values for the intensity information of the light measured for a preset time.

4. The system of claim 1, wherein the processor calculates an average value obtained by averaging signal values for the intensity information of the light measured for a preset time, removes a direct current signal by subtracting the average value from the signal values for the intensity information of the light measured for the preset time, converts a result value obtained by removing the direct current signal into a frequency domain, and averages frequency signal values in the frequency domain to calculate the flickering information.

5. The system of claim 4, wherein, when the calculated flickering information is equal to or more than a preset flickering value, the processor detects flame and determines whether there is fire.

6. The system of claim 1, wherein the processor calculates centroid positions by averaging location information in first and second directions of the light measured for a preset time, respectively, and calculates the centroid spatial distribution information indicating distances from the centroid positions over time by summing or averaging distances between the centroid positions and the location information.

7. The system of claim 6, wherein when the centroid spatial distribution information is greater than a preset distance to a centroid, the processor detects flame and determines whether there is fire.

8. The system of claim 6, wherein the processor determines a scale of the fire on the basis of a degree of increase or decrease in the centroid spatial distribution information over time.

9. The system of claim 6, wherein the processor acquires direction information of the flame by tracking a location of the averaged centroid position.

10. A method for detecting flame, the method comprising:
a step of collecting light emitted from flame;
a step of sensing location information and intensity information of the collected light;
a step of calculating intensity information and flickering information of the flame from the intensity information of the light;
a step of calculating centroid spatial distribution information of the flame from the location information of the light; and
a step of detecting whether there is flame on the basis of at least one of the intensity information of the flame, the flickering information, and the centroid spatial distribution information.

11. The method of claim 10, wherein, in the step of calculating intensity information and flickering information of the flame from the intensity information of the light, the intensity information of the flame is calculated by averaging signal values for the intensity information of the light measured for a preset time.

12. The method of claim 10, wherein, in the step of calculating intensity information and flickering information of the flame from the intensity information of the light, an average value obtained by averaging signal values for the intensity information of the light measured for a preset time is calculated, a direct current signal is removed by subtracting the average value from the signal values for the intensity information of the light measured for the preset time, a result value obtained by removing the direct current signal is converted into a frequency domain, and the flickering information is calculated by averaging frequency signal values in the frequency domain.

13. The method of claim 12, wherein, in the step of detecting whether there is flame, when the calculated flickering information is equal to or more than a preset flickering value, flame is detected and whether there is fire is determined.

14. The method of claim 10, wherein, in the step of calculating centroid spatial distribution information of the flame from the location information of the light, centroid positions are calculated by averaging location information in first and second directions of the light measured for a preset time, respectively, and the centroid spatial distribution information indicating distances from the centroid positions over time is calculated by summing or averaging distances between the centroid positions and the location information.

15. The method of claim 14, wherein, in the step of detecting whether there is flame, when the centroid spatial distribution information is greater than a preset distance to a centroid, and flame is detected and whether there is fire is determined.

16. The method of claim 14, wherein the step of detecting whether there is flame comprises:
a step of determining a scale of the fire on the basis of a degree of increase or decrease in the centroid spatial distribution information over time.

17. The system of claim 14, wherein the step of detecting whether there is flame comprises:
a step of acquiring direction information of the flame by tracking a location of the averaged centroid position.

* * * * *